3,136,043
MACHINE TO AUTOMATICALLY MANUFACTURE TRANSFORMERS

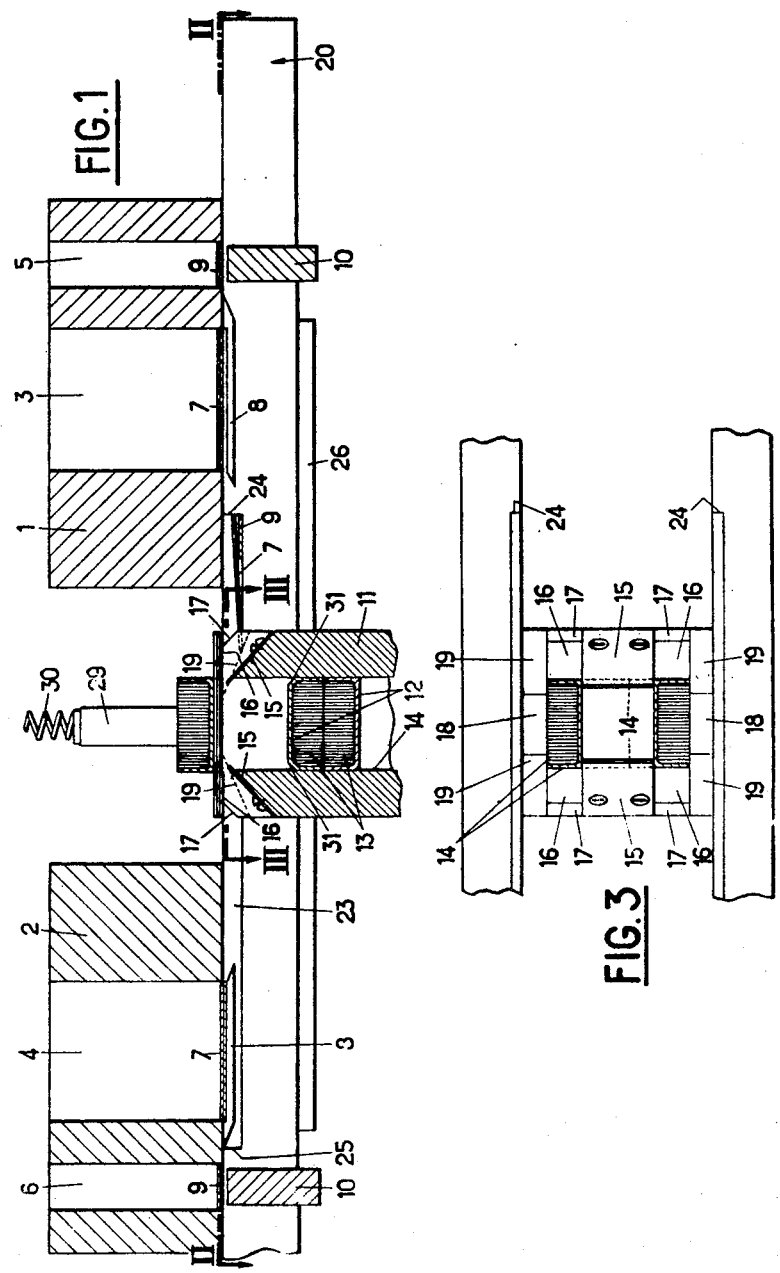

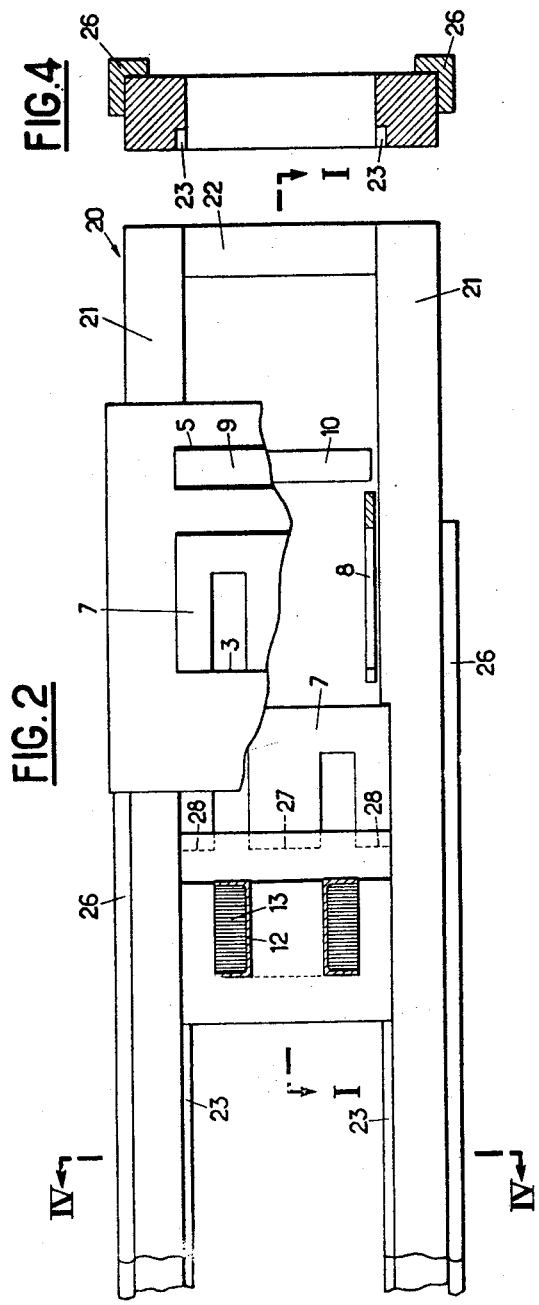

Rene Louis Jean Ruellan, 19 Rue Camille Flammarion, Saint-Dizier, France
Filed Apr. 27, 1962, Ser. No. 190,543
Claims priority, application France May 5, 1961
3 Claims. (Cl. 29—203)

Transformers and filter coils, especially for low and medium power applications, generally consist of a single coil comprising one or more windings, on which a magnetic circuit, usually in the form of a figure 8 is then mounted, said circuit consisting of stacks of inter-fitting laminations. This permits the coils to be wound automatically, but requires that the laminations be put in place by hand.

The object of the present invention is to make the mounting of the interfitting metallic laminations of the magnetic circuit on the coils equally automatic.

The present invention comprises a new machine designed to automatically manufacture transformers, beginning with previously wound coils and two types of laminations already cut out for use in forming the magnetic circuit, this machine being essentially characterized by the fact that it comprises two double magazines, each containing the two types of laminations oriented in the proper direction, and provided with fixed stops which prevent these laminations from leaving except by lateral displacement, a coil support provided with ramps which facilitate the introduction of the laminations and the feeding in of coils from a magazine, together with a carriage in the form of a member which moves in alternate directions between the two double magazines, this carriage being provided on opposite sides with a slot for receiving the laminations, and a stop at each end of this slot designed to laterally extract in the desired order the two types of laminations, while passing under the corresponding double magazine, and then to push the coil into place, the progressive movement of this coil automatically resulting in putting the successive laminations in place.

In order that the invention may be better understood, I will now describe, purely by way of illustration, one embodiment thereof, taken purely by way of example, and illustrated on the accompanying drawings, in which:

FIG. 1 is a longitudinal section taken along the line I—I of FIG. 2;

FIG. 2 is a partial section taken along the line II—II of FIG. 1;

FIG. 3 is a section taken along the line III—III of FIG. 1 showing at its top the magazine for the coils; and FIG. 4 is a section taken along the line IV—IV of FIG. 2.

These figures show double magazines 1 and 2 provided with vertical recesses 3 and 4 respectively to receive the E-shaped laminations, and vertical recesses 5 and 6 respectively to receive the I-shaped laminations. The E-shaped laminations are designated by reference numeral 7 and positioned as shown on FIG. 2. At the bottoms of the recesses 3 and 4 are the horizontal fingers 8 mounted on the bottoms of the magazines 1 and 2 and leaving a clearance sufficient to permit only one plate at a time to slip out laterally. The plates 7 in the recess 4, not shown in FIG. 2, are dispensed in the opposite direction.

Below the recesses 5 and 6 which hold the I-shaped plates 9 are the stops 10 which are shown as if they were stationary, and which also leave a clearance just sufficient to permit the lateral release of one plate 9 at a time.

At the center of the machine is the magazine 11 holding the coils 12 with their windings 13. This magazine comprises a central rectangular passage 14 for the coils and its upper part is provided with two inclined ramps, each formed by a flexible member 15, the width of which is equal to that of the square or rectangular hole in the coil. It also comprises four horizontal plane portions 16, each preceded by a ramp 17 and positioned within a width corresponding to the clearance of the coils, and finally two flat parts 18 each provided on each side with inclined ramps 19.

A carriage 20 surrounds the magazine 11 below the magazines 1 and 2. This carriage is in the form of a rectangle consisting of two longitudinal members 21 connected by two transverse members 22. The two longitudinal members are each provided with a groove 23 best seen on FIG. 4, terminated at either end by abutments 24 and 25. The carriage is slidably supported on rails 26 and reciprocated by mechanism not shown. When the carriage moves from right to left the abutment 24 catches an I-shaped sheet 9 and extracts it from the magazine 5, and catches an E-shaped plate 7 and extracts it from the magazine 3, this plate falling on top of the I-shaped plate.

When the carriage arrives at the position shown on FIGS. 1 and 2, the plates 7 and 9 occupy the position at which they are shown therein. As the movement continues, the end 27 of the plate 7 is pushed upward beneath the preceding stack by the flexible leaf spring 15 at the right, while the lateral edges 28 of the same plate 7 are also pushed under the stack, first by the ramps 19, then by the horizontal parts 18. Finally, when the front edge of the I-shaped sheet 9 encounters the ramp 17, it is also pushed under the pile, and particularly under the plate 7, which is being brought into position. Then this same plate 9 is held against the pile by the horizontal parts 16.

At this moment the carriage stops and the length of the groove 23 is such that the abutment 25 is ready to act, in its turn, on a plate 9 and a plate 7 from the magazine 2, thus performing the same operation from the opposite direction. It is clear that each reciprocation of the carriage lifts the coil 12 and the stack of plates a distance equal to twice the thickness of a single plate. Pressure means 29 biassed by a spring 30 (FIG. 1) resists the upward motion of the coil in order that the stack may be adequately held.

When the central hole in the coil is almost completely filled, the ends of the flexible leaf springs 15 enter the champfers 31 provided for this purpose in the coil, and the last reciprocation of the carriage 20 brings the last two E-shaped plates into place. During these last two movements the two stops 10 are raised by a mechanism not shown, a distance equal to or greater than the thickness of a plate, so that in its last reciprocation the carriage does not pick up I-shaped plates, since it is obvious that these last two plates, if simply positioned at the bottom of the stack would not be firmly held. Means for measuring the thickness of the stack or for counting the movements of the stops 10 then, after a single reciprocation, causes another coil 12 to be lifted up to take the place of and force out the completed transformer, as is permitted by the flexibility of the leaf springs 15. As the coil rises, a mechanism not shown displaces the pressure means and ejects the completed transformer before releasing the pressure means, and a new cycle is begun.

In another embodiment of the invention, the coils, instead of being fed from the bottom of the device, are supplied from a magazine positioned at its top, the coil support being then distinct from this magazine. This coil support may open in two places to permit both the introduction and removal of coils from the top without requiring leaf springs to form the ramps 15.

Finally, it will be seen that the machine according to the invention automatically manufactures transformers, but comprises a relatively small number of parts, only one of which reciprocates. This reciprocation, as well as the movement of the pressure means 29, the displacement of the stops 10 at the end of the cycle, and that of the succeeding coil, may be brought about by any suitable means, as for instance, pneumatic cylinders, electrically controlled valves, and relays correlated to provide automatic completion of the cycle.

It will, of course, be understood that the foregoing embodiment has been described purely by way of illustration and may be modified as to detail without thereby departing from the teaching of the invention as defined by the following claims.

What is claimed is:

1. A machine for automatically applying laminations of magnetic metal to a preformed annular coil to construct a transformer, said laminations being of two complementary shapes, and said machine comprising a vertical channel for holding said coil, a magazine on each of two opposite sides of said coil for holding laminations of each of said two shapes, means on each magazine for removably exposing the laminations therein one at a time, a carriage mounted to reciprocate beneath said magazine about a coil held by said coil holding means past said exposed laminations, catch means on said carriage for catching an exposed lamination from each magazine on one side when it moves in one direction and on the other side when it moves in the other direction and for bringing said laminations into contact with said coils with a portion of those laminations of at least one of said shapes projecting into said coil, resilient means athwart said channel positioned to bias one section of said coil against the lamination portion projecting thereinto, and guide means adjacent said coil holder in the path of said carriage for successively guiding the laminations caught by said carriage into a stack interfitting with said coil, and clear of the path travelled by said catch means.

2. A machine as claimed in claim 1 in which said guiding means comprises leaf springs in the path travelled by said laminations when caught by said catch means, said leaf springs being angularly disposed to raise said laminations above said path.

3. A machine as claimed in claim 1 in which said means for removably exposing the laminations of one of said shapes comprises supporting means positioned immediately beneath each of the magazines for laminations of that shape clear of the path of travel of said catch means, said supporting means being vertically adjustable to prevent exposure of any of the laminations supported thereby during one reciprocation of the carriage after they have been successively exposed during a number of reciprocations.

References Cited in the file of this patent

UNITED STATES PATENTS

| | | |
|---|---|---|
| 2,494,349 | Mittermaier | Jan. 10, 1950 |
| 2,842,838 | Macchione | July 15, 1958 |